Nov. 24, 1931.  T. A. McINTYRE  1,833,031
VARIABLE SPEED TRANSMISSION
Filed June 18, 1930   3 Sheets-Sheet 1

INVENTOR.
THOMAS A. McINTYRE
BY *Arthur L. Slee*
HIS ATTORNEY.

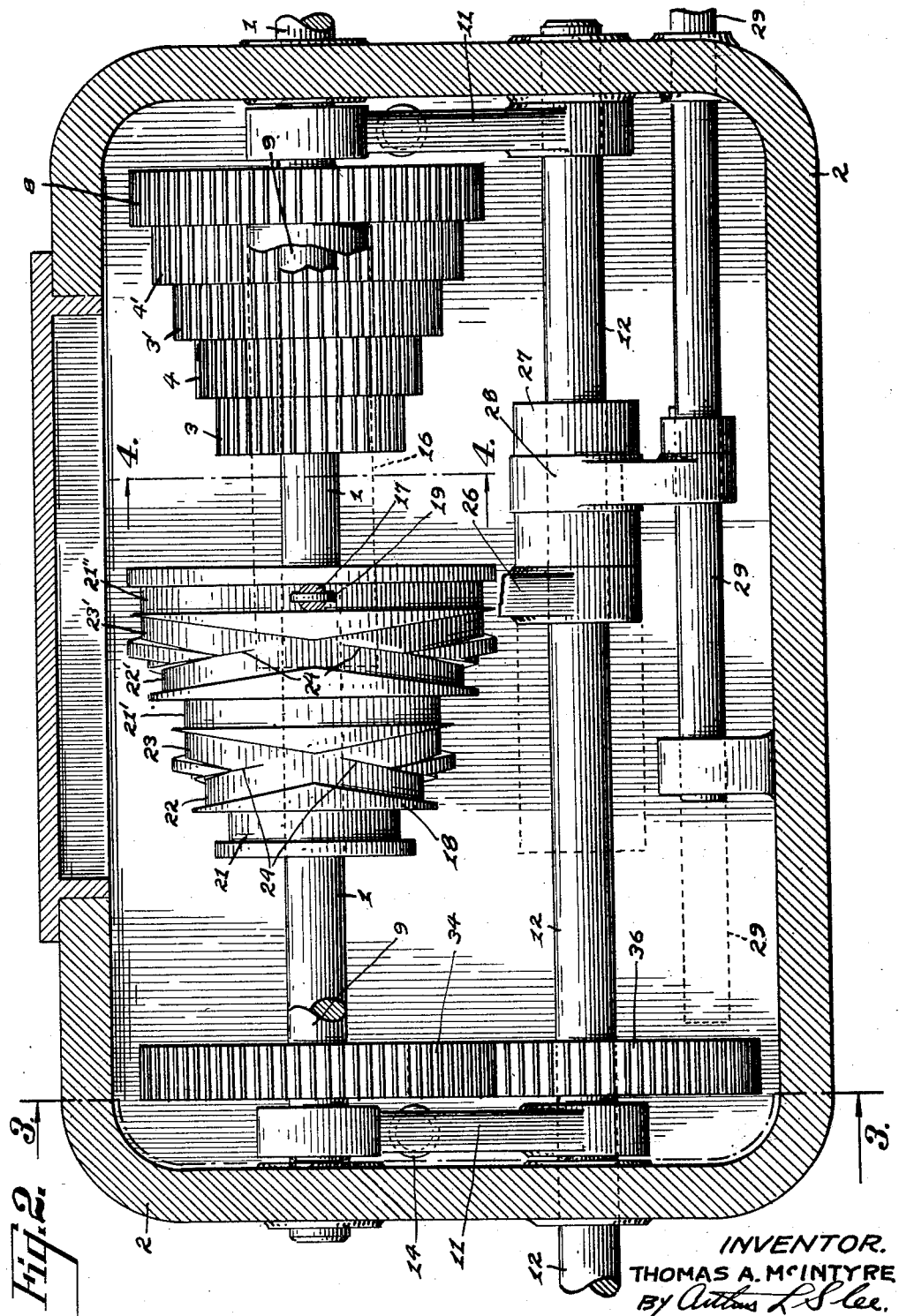

Nov. 24, 1931.  T. A. McINTYRE  1,833,031
VARIABLE SPEED TRANSMISSION
Filed June 18, 1930  3 Sheets-Sheet 3
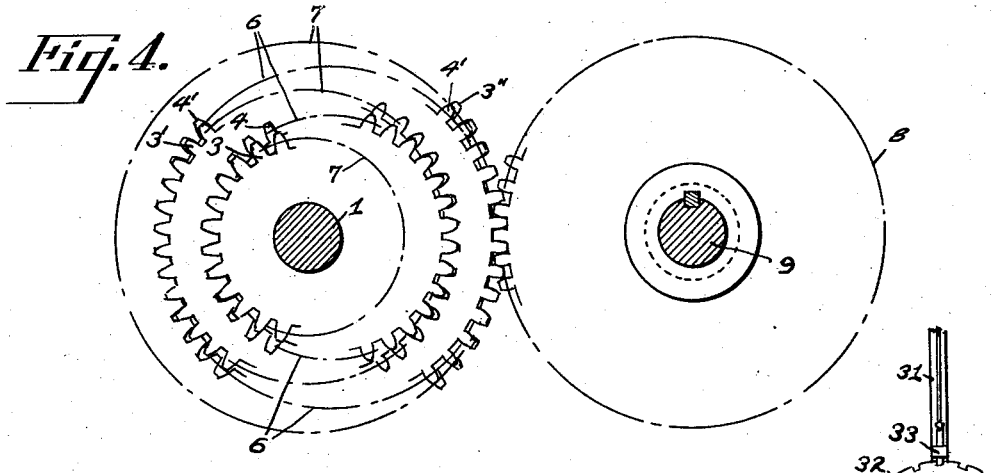
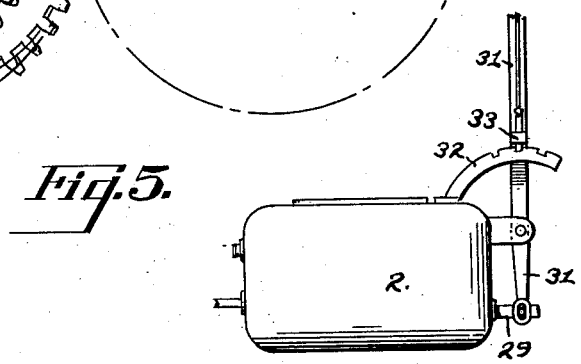
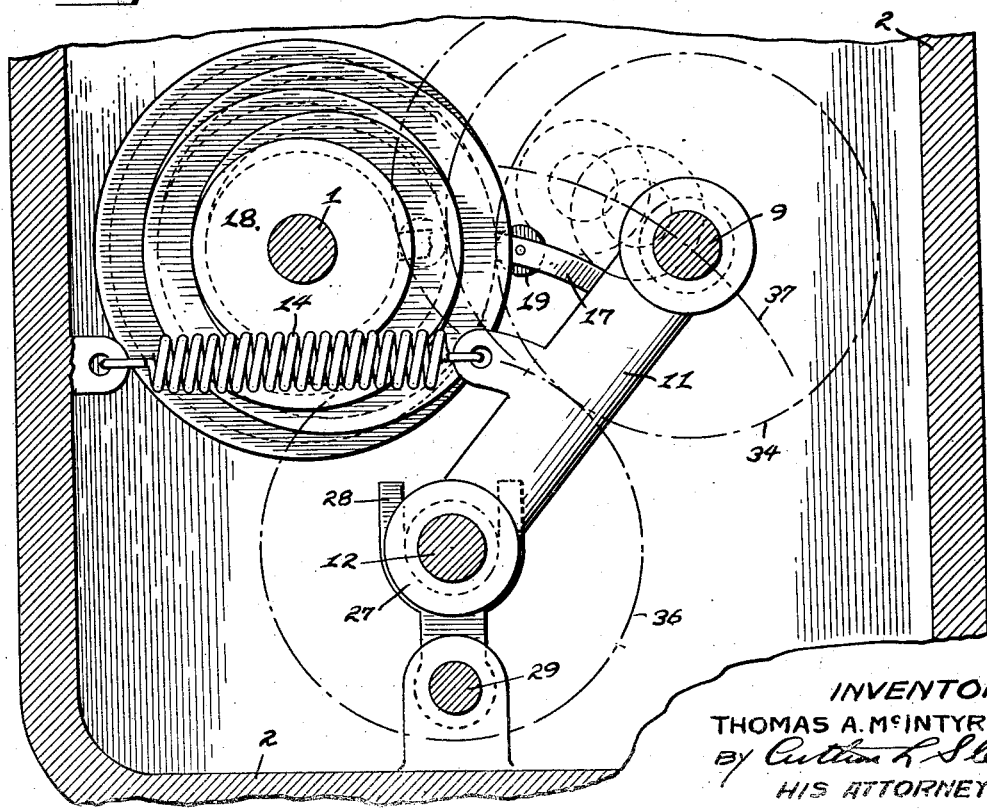
INVENTOR
THOMAS A. McINTYRE.
BY
HIS ATTORNEY.

Patented Nov. 24, 1931

1,833,031

UNITED STATES PATENT OFFICE

THOMAS A. McINTYRE, OF SAN FRANCISCO, CALIFORNIA

VARIABLE SPEED TRANSMISSION

Application filed June 18, 1930. Serial No. 461,989.

My invention relates to improvements in variable speed transmissions wherein driving gearing, comprising a plurality of concentric gears of the same pitch and of various diameters, and a plurality of eccentric gears mounted between the concentric gears, with teeth thereof matching with teeth of concentric gears upon opposite sides thereof, is engaged by a transmission gear axially and transversely movable relative to said gearing to engage desired concentric portions thereof, said transmission gear being movable from one concentric gear to another along the intermediate eccentric gear without being unmeshed from the driving gears.

The primary object of my invention is to provide an improved variable speed transmission to transmit power in various speed and power ratios.

Another object is to provide an improved transmission wherein the speed and power ratio may be varied at will without causing the transmission gears to be unmeshed.

A further object is to provide an improved variable transmission wherein a driven gear may be shifted into engagement with driving gears of various size without being unmeshed and without interrupting the transmission of power therebetween.

Another object is to provide an improved device of the character described provided with improved means for shifting a movable transmission gear in timed relation to the rotation of the driving gearing, said means operating to prevent shifting of the transmission gear at times other than when the driving gearing is in proper shifting relation thereto.

A further object is to provide an improved mechanism wherein the power transmitting gears are kept constantly in mesh, and provided with improved means for shifting a driven gear to engage desired driving gears.

Another object is to provide improved gear shifting means for quickly and positively shifting gears in timed relation to the rotation of said gears.

A still further object is to provide an improved mechanism of the character described which is compact, rugged, and economical in construction and which is simple and efficient in its operation.

I accomplish these and other objects as hereinafter appearing by means of the improved device disclosed in the drawings forming a part of the present application wherein like characters of reference are used to designate similar parts throughout the specification and drawings, and in which—

Fig. 2 is a side elevation of the transmission, parts being broken away, and the housing being shown in vertical section;

Fig. 3 is a broken transverse vertical section taken upon the line 3—3 of Fig. 2 in the direction indicated;

Fig. 4 is a diagrammatic sectional view taken upon the line 4—4 of Fig. 2 in the direction indicated and showing the relation of the driving gears and transmission gear; and Fig. 5 is a side elevation, drawn upon a reduced scale, showing the manual shifting means.

Figure 1:
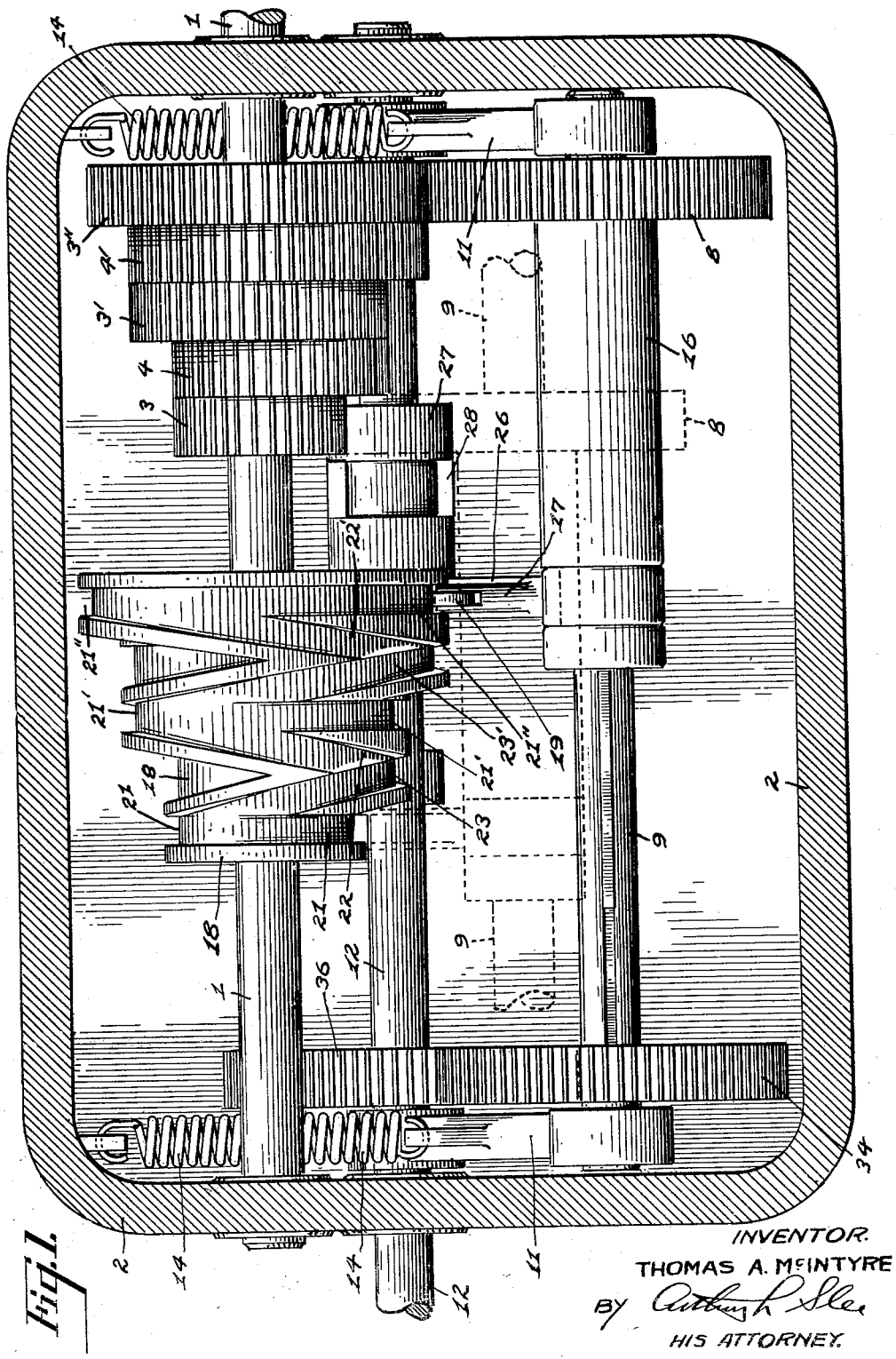
Fig. 1 is a plan view of my improved variable transmission, the housing being shown in horizontal section.

Referring to the drawings, the numeral 1 is used to designate in general a drive shaft driven through suitable clutch connections, not shown, from a suitable source of power, such as an internal combustion engine, not shown. The drive shaft 1 is journaled in a suitable transmission housing 2 in any convenient manner.

The drive shaft 1 is provided with drive gearing comprising a plurality of concentric gears 3, 3' and 3" secured upon the shaft 1 and rotatable therewith. In the drawings, I have illustrated only three concentric gears, but this number may be varied to meet any particular requirement. The gears 3, 3' and 3" are mounted in axial spaced relation and are of progressively increasing diameters, all of said gears 3 being provided with teeth of the same pitch.

Eccentric gears 4 and 4' are mounted upon the drive shaft 1 between the concentric gears 3, said gears 4 being arranged with their sides in proximate relation to the adjacent sides of the adjacent gears 3. The gears 4 are provided with teeth of the same pitch as the teeth of the gears 3, said teeth being so arranged that the teeth nearest the axis of rotation of the eccentric gears and at one end of a diameter thereof will match with the teeth of the adjacent concentric gear 3 of smaller diameter upon one side thereof, while the teeth most distant from the axis of rotation and at the opposite end of said diameter will match with the corresponding teeth of the concentric gear of larger diameter upon the opposite side of each eccentric gear.

This arrangement is best illustrated diagrammatically in Fig. 4 of the drawings wherein it will be observed that the pitch circle of the teeth upon each eccentric gear 4 indicated by broken lines 6, is arranged to match with the pitch circle of the adjacent small concentric gear 3 upon one side of the shaft and with the pitch circle of the adjacent larger gear 3 upon the diametrically opposite side of the shaft 2, the pitch circles of the gears 3 being indicated by broken lines 7. The teeth of the eccentric gears 4 are arranged to abut with the teeth of the adjacent concentric gears 3 in longitudinal alinement along the matching portions of the pitch circles 6 and 7. Teeth, disposed at the point where the circles 6 and 7 are equidistant from the axis of rotation of the shaft 2 exactly coincide, and for an interval of several teeth upon each side of this point the teeth of the adjacent concentric and eccentric gears so nearly coincide as to operatively mesh with a common driven gear.

A driven transmission gear 8 is feathered upon a transmission shaft 9 movably mounted parallel to the drive shaft 2, preferably upon the free ends of a pair of arms 11 which are pivotally mounted at their opposite ends upon a driven shaft 12 journaled in the ends of the housing and extending outwardly therefrom. The gear 8 is of any suitable size and provided with teeth of the same pitch as the teeth of the driving gears 3 and 4 whereby said gear 8 may mesh with any of said gears 3 and 4. The arms 11 are provided with springs 14 connected thereto and to the housing 2 to normally move the shaft 12 and gear 8 toward the driving shaft 1 and gears 3 and 4, and operating to hold the gear 8 in meshing relation with said gears 3 and 4.

The gear 8 is secured to a sleeve 16 slidably movable along the shaft 12. The sleeve 16 is provided with an actuating arm 17 engaged by a shifting cam designated in general by the numeral 18, the arm 17 being preferably provided with a suitable antifriction roller 19 to engage the cam.

The cam 18 is mounted within the housing 2 and is rotated by the driven shaft 1 at the same speed as the shaft 1. In the embodiment illustrated in the drawings, the cam 18 consists of a cylindrical body secured directly upon the driven shaft 1 whereby the cam is rotated in common with the drive shaft and the drive gears. The cam 18 is provided with a plurality of concentric tracks 21, 21′ and 21″, corresponding to the several concentric drive gears 3, 3′ and 3″. Eccentric spiral tracks 22 and 22′ extend between adjacent concentric tracks 21 to engage and move the arm 17 forwardly and outwardly from the smallest to the largest diameters of the cam 18, and eccentric spiral tracks 23 and 23′ extend in the opposite direction between adjacent concentric tracks 21 to engage and move the arm 17 in the opposite direction from the largest to the smallest portions of the cam. The tracks 22 and 23 intersect between the cencentric tracks 21, the bottoms of the intersecting tracks being partially cut away along the lines of intersection, as at 24, whereby the relative lift and drop of said tracks is uninterrupted across the intersection. The rising portions of the tracks operate to continue the proper lifting action, while the cut away portions permit the proper drop when the arm 17 is being moved in the opposite direction.

The tracks 21 and the arm 17 are so arranged that when the gear 8 engages a gear 3, 3′ or 3″, the arm will be engaged within a concentric track 21, 21′ or 21″ respectively, and the lift or drop of the tracks 22 and 23 is made to conform to the relative difference in diameter between adjacent gears 3 and the change in distance of the teeth of gears 4 from the axis of rotation. The openings from the eccentric spiral tracks into the concentric tracks are positioned to correspond to the matching teeth of the gears 3 and 4 whereby the arm 17 may be moved from a concentric track 21 into an eccentric spiral track 22 or 23 only at the moment the matching teeth of gears 3 and 4 are in meshing relation with the driven transmission gear 8. The rise or drop begins after the longitudinal movement has been started so that the gear 8 will leave a gear 3 before the arm 17 is moved outwardly or inwardly from the axis of the shaft 1 and cam 18.

The sleeve 16 and arm 17 is actuated by means of an arm 26 slidably and rotatably mounted upon the shaft 12 and rotatably connected to the sleeve 16, said arm 26 being alined with the arms 11 and being pivotally movable in the same manner as said arms 11. The end of the arm 26 engaging the shaft 12 is provided with a collar 27 engaged by a yoke 28 secured upon an actuating rod 29 slidably mounted in spaced parallel relation to the shaft 12. The rod 29 is engaged by one end of a pivoted hand shifting lever 31 pivotally mounted adjacent the housing 2. A notched segment 32 is mounted adjacent the lever 31 and arranged to be engaged by suitable latch mechanism 33 to releasably secure the lever in positions defining various positions of the gear 8 relative to the gears 3.

The transmission shaft 9 is provided with a gear 34 secured thereon and meshing with a gear 36 secured upon the driven shaft 12 to deliver power from the transmission shaft to the driven shaft. The gear 34 is moved by the arms 11 and shaft 12 along an arcuate path concentric with the gear 36 as indicated by broken line 37 whereby the gears 34 and 36 will be held in operative meshing relation, regardless of the pivotal movement of the arms 11 and the shifting of the shaft 9 as the gear 8 is moved to engage the various driving gears 3 and 4.

The housing 2 is arranged to contain an adequate supply of lubricant whereby the gears and cam will be kept thoroughly lubricated.

In operation, power delivered to the drive shaft 1 operates to rotate said shaft together with the gears 3 and 4 and the cam 18 at the same speed as the driving motor or engine. The gear 8 is normally placed in engagement with the smallest of the concentric gears 3 whereby a maximum power will be delivered at a relatively low speed to the gear 8 and shaft 12 when the motive power is connected to the drive shaft 1 through the usual clutch mechanism. In this normal position, the arm 17 is engaged by the concentric track 21 of smallest diameter, the arm being retained in this position by the hand lever latch 33.

When it is desired to shift to a higher speed, the hand lever latch 33 is released and pressure is applied to the lever 31 to move the same forwardly toward the notch defining the next higher speed. The concentric track 21 maintains its engagement with the arm 17 until the opening into the spiral eccentric track 22 is moved into alinement with the arm, at which moment, the pressure applied upon the lever will cause the arm to be advanced into the track 22. The rotation of the cam immediately causes the arm to be displaced laterally and at the same time moved longitudinally into engagement with the concentric track 21'. At the same time, the gear 8 is moved longitudinally to slip from the teeth of the smallest gear 3 into mesh with the teeth of the adjacent eccentric gear 4, the movement of the arm 17 into the track 22 being timed to correspond to the time the matching teeth of the gears 3 and 4 are moved into meshing relation with the teeth of the gear 8. As the gear 8 moves onto the gear 4, the lift of the track 22 causes the shaft 9 to be displaced away from the shaft 1 and the gear 8 to be moved laterally outward, at a rate corresponding to the rise of the eccentric gear 4. As the matching teeth of the gear 4 and concentric gear 3' mesh with the gear 8, the longitudinal movement imparted by the arm 17 causes the gear 8 to slip onto the gear 3' and free from the eccentric gear 4.

To shift from the gear 3' to the gear 3'' the process above explained is repeated, the arm 17 being pressed into the eccentric track 22' and the gear 8 being moved onto the eccentric gear 4' and thence onto the gear 3''. The second shift may be made as a direct continuation of the first shift, or may be made after a desired delay with the gear 8 in engagement with the intermediate gear 3'.

To shift from a higher to a lower gear, the hand lever 31 is moved rearwardly to move the arm 17 into a return track 23, thereby causing the gear 8 to be moved from a gear 3 onto an adjacent eccentric gear 4 whereby the gear 8 is lowered onto the next lower concentric gear 3.

As the gear 8 is moved from a small to a larger gear 3, the arms 11 are moved against the tension of the springs 14 from the positions indicated in dotted lines in Fig. 3 to the position indicated in full lines in said figure. The springs operate to hold the gear 8 in meshing relation with the driving gears 3 and 4. The gear 8 moves onto an eccentric gear 4 before disengaging a gear 3, and as the eccentric gears 4 are actuated in common with the gears 3, there will be no interruption in the delivery of power to the gear 8 while being shifted from one concentric gear 3 to another. The arm 17 and tracks 22 and 23 operate to maintain proper clearance for the teeth of the gear 8 and gears 3 and 4.

My invention is suitable for installation upon automobiles and the like whereby the movable gear 8 may be shifted to obtain desired speed and power ratios without unmeshing the gears at any time and without interrupting the delivery of power, thereby avoiding any clashing of gears and obtaining a smoother acceleration or deceleration as desired.

While I have illustrated and described only one embodiment of my invention, the specific details of construction and arrangement are subject to modification in numerous ways without departing from the spirit of my invention. I therefore do not wish to be restricted to the specific details of construction and arrangement illustrated and described, but desire to avail myself of all modifications which may fall within the scope of the appended claims.

Having thus described my invention, what I claim as new and desire to secure by Letters Patent is:

1. A variable speed transmission comprising a driving shaft; a driven shaft; a plurality of concentric driving gears of the same pitch and of progressively increasing diameters mounted in spaced relation upon the driving shaft; eccentric gears mounted upon the driving shaft intermediate the concentric gears and having teeth thereof in matching alinement with teeth of the adjacent concentric gears; a pair of arms pivotally mounted adjacent the driving and driven shafts; a transmission shaft mounted upon said arms in parallel relation to the driving and driven shafts and movable relative thereto; a transmission gear feathered upon the transmission shaft and having teeth to mesh with the teeth of the concentric and eccentric gears, said transmission gear being movable longitudinally of the transmission shaft into meshing relation with a desired driving gear and the arms and transmission shaft being movable to conform to the different diameters of gears; means actuating the arms and transmission shaft to hold the transmission gear in mesh with the driving shaft gears; and cam means for shifting the transmission gear longitudinally to engage a desired driving gear in timed relation to the rotation of the eccentric gears; and gear means to transmit power from the transmission shaft to the driven shaft.

2. A variable speed transmission comprising a driving shaft; a driven shaft; a plurality of concentric driving gears of the same pitch and of progressively increasing diameters mounted in spaced relation upon the driving shaft; eccentric gears mounted upon the driving shaft intermediate to the concentric gears and having teeth thereof of the same pitch and in matching alinement with the teeth of the adjacent concentric gears; a pair of arms pivotally mounted upon the driving shaft; a transmission shaft rotatably mounted upon the free ends of the arms; a transmission gear feathered upon the transmission shaft and having teeth of the same pitch and meshing with the teeth of the concentric and eccentric drive gears, said transmission gear being movable longitudinally along the transmission shaft to engage any desired drive gear; springs connected to the arms to normally move the transmission shaft toward the driving shaft and hold the transmission gear in meshing relation with the drive gears, said springs being yieldable to permit pivotal displacement of the transmission shaft when the transmission gear engages an accentric drive gear; a cam mounted upon the driving shaft, said cam having concentric tracks and having eccentric tracks connecting the concentric tracks to correspond to the concentric and eccentric drive gears; means connected to the transmission gear and engaging the tracks of the cam for moving said gear longitudinally along the transmission shaft into engagement with desired driving gears in timed relation to the rotation of the eccentric gears; manually operable shifting means connected to the cam engaging means to move the same from a concentric track to an eccentric shifting track; a driven gear mounted upon the driven shaft; and a gear mounted upon the transmission shaft in meshing relation with the driven gear to transmit power from the transmission shaft to the driven shaft, said gear being movable along an arcuate path relative to the driven gear to maintain engagement with said driven gear when the transmission gear is moved from one concentric driving gear to another.

3. In a variable speed transmission, a gear shifting cam having a plurality of concentric tracks spaced longitudinally of the cam and at different radial distances from the axis of the cam, said cam also having a plurality of oppositely directed spiral grooves connecting adjacent concentric tracks and having treads eccentrically disposed to the axis of the cam and merging with the adjacent concentric tracks; and gear shifting means constantly engaging the cam and movable to selectively engage desired tracks.

4. In a variable speed transmission, a gear shifting cam having a plurality of concentric tracks spaced longitudinally of the cam and at different radial distances from the axis of the cam, said cam also having a plurality of oppositely directed spiral tracks connecting adjacent concentric tracks and intersecting at points between the concentric tracks; and gear shifting means constantly engaging the cam and movable to selectively engage desired tracks.

5. In a variable speed transmission, a gear shifting cam having a plurality of concentric track grooves spaced longitudinally of the cam and having the bottoms of said grooves at different radial distances from the axis of the cam, said cam also having a plurality of spiral track grooves connecting the concentric grooves and having their bottoms inclining from one end to the other and merging with the bottoms of the adjacent concentric track grooves; and gear shifting means constantly engaging the cam and movable to selectively engage desired tracks.

In witness whereof, I hereunto set my signature.

THOMAS A. McINTYRE.